ional Patent

United States Patent [19]
Ebner et al.

[11] 4,011,202
[45] Mar. 8, 1977

[54] SEPARATING VAPOROUS REACTION PRODUCT IN THE PRODUCTION OF POLYESTERS

[75] Inventors: Karl Ebner, Oberursel; Franz Ettinger, Kassel; Rudolf Fuchs, Fuldabruck; Helmut Schnorr, Kassel, all of Germany

[73] Assignee: Akzona Incorporated, Asheville, N.C.

[22] Filed: Feb. 27, 1975

[21] Appl. No.: 553,681

[30] Foreign Application Priority Data

Feb. 27, 1974 Germany .......................... 2409343

[52] U.S. Cl. .............................. 260/75 M; 203/91; 203/DIG. 14
[51] Int. Cl.² ....................................... C08G 63/22
[58] Field of Search ..... 260/75 M; 203/91, DIG. 14

[56] References Cited
UNITED STATES PATENTS 3,468,849  9/1969  Rothert ........................... 260/75 M

FOREIGN PATENTS OR APPLICATIONS 1,545,221  12/1970  Germany
1,949,911  4/1971  Germany
2,227,261  1/1973  Germany

*Primary Examiner*—Murray Tillman
*Assistant Examiner*—W. C. Danison, Jr.
*Attorney, Agent, or Firm*—Johnston, Keil, Thompson & Shurtleff

[57] ABSTRACT

A process for the production of linear fiber-forming polyesters, especially polyethylene terephthalate, wherein vaporous reaction products are separated in an improved manner by suction withdrawal from the polymerization reactor through the action of a fluid vacuum jet or aspirator which is supplied with recirculated glycol vapor as the propellant or jet fluid for the aspirator and also by further suction through the action of a recirculated glycol liquid operating a liquid circulating vacuum pump in a final separation of non-condensable gases such as nitrogen from residual condensable vapors. The process is especially useful in preventing the discharge of the vaporous by-products into the surrounding environment during the production of the polyester product.

10 Claims, 1 Drawing Figure

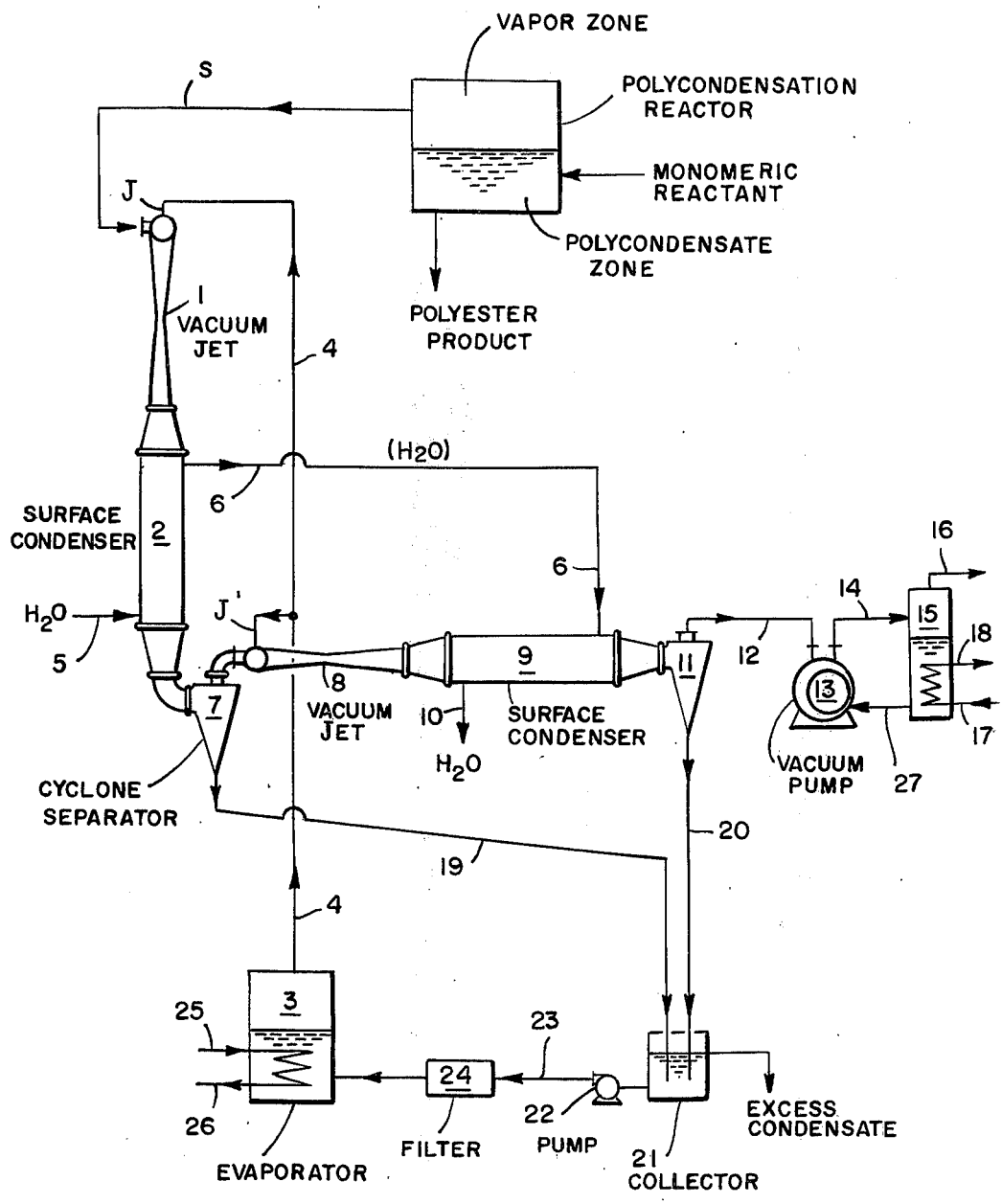

SEPARATING VAPOROUS REACTION PRODUCT IN THE PRODUCTION OF POLYESTERS

This invention is essentially concerned with a process used for the separation of vaporous reaction products in the production of polyesters, and especially in the production of polyethylene terephthalate or modifications thereof as a linear fiber-forming polymer obtained by a well known polycondensation reaction. In this reaction, it is necessary to apply a suction line to the vapor zone of the reactor in which the polycondensation is carried out, thereby permitting the removal of gaseous or vaporous products during the course of the reaction.

One process is known from the German Auslegeschrift (DT-AS) No. 1,545,221 wherein the vaporizable lower molecular weight portions of the molten fiber-forming polymer are separated in the polycondensation. For example, the ethylene glycol set free in the polycondensation of the ethylene glycol diester of terephthalic acid into polyethylene terephthalate as well as small amounts of the unreacted diglycol ester are drawn off from the vapor zone of the reactor with a vacuum of about 0.4 mm.Hg by means of a vacuum jet. The withdrawn reaction vapors are condensed together with the steam serving as the propellant or working fluid of the vacuum jet by using a condenser attached to the outlet side of the vacuum jet. The ethylene glycol contained in the resulting condensate is largely recovered by distillation of this condensate in most cases. The water which is then to be drained off still contains residual glycol and dimethyl terephthalate in relatively large amounts, and further separation can be carried out only incompletely and at considerable expense.

The resulting disadvantages, i.e., unnessary loss of glycol on the one hand and undesirable evnironmental pollution on the other hand, have been considered in the printed German Patent Specification (DT-OS) No. 2,227,261. In this case, in order to more completely recover the glycol and to reduce pollution, it is suggested that ethylene glycol as a vapor or liquid be used as the working fluid which acts as the jet suctioning means in producing the required vacuum. Liquid ethylene glycol is also useful as a cooling agent, insofar as mixing condensers are used for the condensation of the suctioned off reaction vapors, and the resulting condensate is conducted in closed circulation.

The idea had been known from the polycaprolactam extraction disclosed in the printed German patent Specification (DT-OS) No. 1,949,911 that one could use as the propellant or working fluid to operate the vacuum jet either the vapor being extracted or vaporized or else its condensate. While this idea could then be adapted to a similar step in the production of a linear fiber-forming polyester, i.e. to completely recover the glycol and purify the water, the process recommended in DT-OS 2,227,261 does not completely solve the problem. In this case, the mixture of condensed and non-condensed components leaving the condenser are conducted to a collector or storage vessel having a vapor zone from which the non-condensed components are withdrawn over a discharge conduit. Since a vacuum of less than 1 mm.Hg prevails in the reactor, compression must take place over several stages to achieve atmospheric pressure. As a rule, however, a vacuum still prevails as a rule in the collector. Therefore, it is impossible to avoid glycol and/or the monomeric ester, i.e., the di-(ethylene glycol) ester of terephthalic acid, from being carried over in suctioning off the non-condensable components from the collector.

It is a primary object of the present invention to provide a recovery system for the by-products arising in the production of linear polyesters, especially polyethylene terephthalate, wherein one can substantially prevent the entry of these by-products into waste water or into the air.

Other objects and advantages of the invention will become more apparent upon consideration of the following detailed disclosure taken with the accompanying drawing, which is a flow sheet diagram or schematic representation of the process of the invention.

In accordance with the invention, it has now been found that a substantial improvement can be achieved in the production of a polyester for the recovery and careful re-use or disposal of vaporous reaction products drawn off by suction from the polycondensation reactor, provided that glycol vapor is supplied as the jet medium or propellant gas to suction off or aspirate the vaporous reaction products through at least a first stage vacuum jet and preferably in at least two sequential vacuum jet or aspirator stages. At least part of the glycol vapor emerging from the at least first stage vacuum jet or aspirator is condensed, and the final separation of non-condensable gases and any residual condensable vapors is carried out by suction withdrawal through a liquid circulating vacuum pump operated by liquid glycol maintained in a closed and preferably indirectly cooled circuit. The non-condensable gases are withdrawn at atmospheric pressure from the high pressure side of the closed circuit while the residual condensable vapors are taken up by the recirculated liquid glycol.

It is especially preferred to provide means to condense glycol vapor emerging from each vacuum jet or aspirator and to pass the resulting condensed vapor, which generally includes other condensed impurities, through a cyclone separator to immediately recover the bulk of the condensable vapors, including a major proportion and preferably at least 80% or more of the glycol vapors, before the non-condensable gases and residual condensable vapors are suctioned off by the liquid glycol operated vacuum pump. The initially condensed bulk of the glycol is then recycled, preferably with a filtering off of higher-boiling and often solidified impurities, such as di-hydroxyethyl-terephthalate, so that this recycled glycol can be evaporated and re-used as the jet or aspirator gas in the vacuum jet or jets.

These and other preferred features of the process according to the invention are explained in greater detail with the aid of the flow sheet drawing which schematically illustrates one especially preferred combination of apparatus useful in carrying out the process of the invention.

At the top of the flow sheet, a polycondensation reactor has been illustrated in a general manner to simply indicate the presence of both a liquid or molten polycondensate zone and a vapor zone from which vaporous reaction products are to be withdrawn through a suction line S. It will be understood that there are many different known reactors which are suitable for carrying out polycondensation reactions, e.g. in the polymerization of terephthalic acid or its dimethyl ester with ethylene glycol as monomers which are first reacted so that the terephthalic acid or its dimethyl ester becomes esterified or transesterified with the ethylene glycol followed by polycondensation of the resulting di-hydroxyethyl terephthalate "monomer" in the polycondensation reactor. The condensation reaction results in ethylene glycol molecules being split off as a vaporous product as the polyethylene terephthalate is formed. In addition, some di-hydroxyethyl terephthalate tends to be vaporized during any continuous polycondensation reaction and other minor impurities may also be vaporized and carried along by the glycol.

The term "glycol" is used herein generally to designate ethylene glycol but polyester other than polyethylene terephthalate or even modifications of this well known fiber-forming polyester permit the use of the other glycols, especially those of about 2 to 10 and preferably 2 to 6 carbon atoms between the two hydroxy groups (HO-R-OH where R is a divalent hydrocarbon, preferably with a saturated aliphatic or cycloaliphatic structure of 2–10, preferably 2–6 and especially 2–4 carbon atoms).

The vaporous reaction products, consisting essentially of the split off glycol vapors are withdrawn from the vapor zone of the reactor through suction line S by the vacuum jet or aspirator 1 operated by glycol vapor as the aspirating fluid or jet medium J so as to pass into the first condenser 2. In passing through the vacuum jet 1, the vapors are compressed for example from a pressure on the low side in line S of about 0.3mm.Hg. to a pressure of about 5.0 mm.Hg. The condenser 2 can be constructed as a direct contact or so-called jet condenser, but it is preferably provided at this point as the illustrated surface condenser where the glycol is initially condensed preferably as far as possible at the existing vacuum. The surface condenser 2 is cooled in this case by indirect heat exchange with a cooling liquid, preferably water (H$_2$0), which is introduced to the cooling surfaces through feed line 5 and drawn off through line 6.

A cyclone separator is preferably attached to the outlet end of the condenser 2, so as to provide a good separation of the condensed glycol together with other impurities. This condensed and cyclone separated stream is continuously conducted over the tube or conduit 19 into the barometrically adjusted collector 21 where excess liquid can be continuously or periodically taken off from the glycol stream being recycled back to evaporator 3. A build-up of impurities is thus completely avoided while permitting a recovery of excess glycol.

A second vacuum jet or aspirator 8, which is also operated by a glycol vapor jet J' in accordance with the invention, suctions the gas or vapors out of the first condensation stage where the temperature of the cooling water determines the partial pressure or vaporous portion of the glycol in the gaseous mixture (which always contains some non-condensable gases such as nitrogen or the like). The jet J' of aspirator 8 compresses the gaseous mixture up to about 30 mm.Hg.

The gases pass through the cyclone separator 7 so that it is possible to separate out the condensed glycol while substantially avoiding an entrainment or carrying off of condensate droplets into the second stage vacuum jet 8. A very good initial condensation and separation of liquid and gaseous components is thereby assured even before the second stage.

The gas is suctioned or aspirated by the aspirator 8 into the second condenser 9 which is also preferably made as a surface condenser with the cooling water in line 6 from the first condenser 2 being supplied in countercurrent indirect heat exchange to the condenser 9 and finally withdrawn at outlet line 10. At the pressure of about 30 mm.Hg in the second condenser 9, one can achieve a very extensive condensation of the glycol still remaining in the gaseous mixture by use of the condensing or cooling water supplied by line 6 so that is is not necessary to supply a separate cooling water or other cooling means in the preferred surface condenser 9. Another cyclone separator 11 is connected to the outlet end of condenser 9, so that the condensed glycol together with any condensed impurities is separated and conducted by line 20 to the collector 21.

Each stage of the vacuum jet or aspirator means thus provides a partial increase in the pressure from an initial vacuum of about 0.3 mm.Hg up to 30 mm.Hg (by way of example) and at the same time maintains relatively high vacuum (very low pressure) in the vapor zone of the reactor. The primary advantage of using a glycol vapor operated vacuum jet resides in the fact that a much higher capacity or efficiency can be achieved at the required low presssures than is possible when using a liquid propellant or jet. Two vacuum jet stages provide an even greater capacity or efficiency in a large scale continuous operation. Thus, the second stage vacuum jet or aspirator is required only to withdraw non-condensable gases and a relatively minor proportion of the still condensable vapors, eg., 20% or less of the glycol. It is also quite important, of course, to employ the glycol split off in the polycondensation reaction as the jet vapor at J or J', preferably ethylene glycol, because this vaporous fluid may be recycled and reused with only very slight losses to the environment and with relatively easy removal of other impurities or contaminants.

The addition of cyclone separators 7 and 11 after their respective condensers 2 and 9 represents a preferred combination of apparatus in the process of the invention in order to prevent as much as possible the carrying over of condensate droplets into the final withdrawal or suctioning off of the gases to bring them up to atmospheric pressure.

This final step or stage in the recovery process of the invention is accomplished by suctioning the residual mixture of non-condensable gases and any remaining condensable vaporous reaction products (especially glycol) through suction line 12 which extends from the last cyclone separator 11 over to the low pressure side of the liquid circulating vacuum pump 13, e.g. a conventional rotary vacuum pump of the so-called wet type. A cycloidal wet vacuum pump is especially useful to provide a low vacuum at a high throughput of non-condensable gases, i.e., air or inert components of air such as nitrogen.

In accordance with the present invention, this vacuum pump 13 is operated with liquid glycol recirculated in a closed circuit through line 14 into the vessel 15 and back to the pump through line 27. The operating liquid, glycol, is separated from the air or non-condensable gases (especially nitrogen) in the vessel 15 as well as completing the separation of any slight amounts of condensable vapors still remaining at this point in the recovery system. Thus, the cooling coil connected to inlet and outlet lines 17 and 18 maintains the liquid glycol used in the closed or sealed circuit at a sufficiently low operating temperature so that essentially only inert non-condensable gases are released to the atmosphere through exhaust line 16.

The special advantage of the sealed liquid glycol operation of the rotary pump 13 as the last vacuum stage in the recovery process resides in the fact that in a compression of the non-condensable gases up to atmospheric pressure in the presence of liquid glycol, the vaporous proportion of glycol is reduced to something less than 1 part in 20. Moreover, the final small droplets of condensed glycol which are unavoidably entrained or carried over from the last condenser are separated by reason of the centrifugal force exerted by the non-condensable gases to that practically no glycol escapes with the exhaust gas at 16.

In extreme cases, where the glycol cannot be completely condensed following the vacuum jet and condenser stages and finally in the sealed recirculated glycol operation of pump 13, it is of course feasible to add still another cyclone separator and/or condenser onto exhaust line 16. Such precautions should not be necessary with the illustrated preferred embodiment of the invention using the apparatus acutally shown.

In addition to bringing the pressure up to about atmospheric pressure to permit a simple exhaust of inert gases through line 16, the liquid glycol operated pump 13 together with cooling coil 17, 18 ensures a final removal of even small amounts of any remaining condensable impurities. However, even after long periods of continuous operation, the build-up of impurities in the recirculated glycol in vessel 15 is very small and so slight that one seldom needs to replace the liquid glycol in the sealed or closed circuit. Even if such replacement is required after long intervals of operation, practically all of the contaminated glycol can be recovered by distillation and reused with only a very small amount of residue to be disposed as a waste material.

The collector 21 which generally receives the bulk of the condensed glycol, e.g. 95% or more, under preferred conditions, is connected by way of the circulating pump 22 over line 23 and filter 24 to the evaporator or vaporizer 3 which can be heated by the heating coil 25, 26. The filter 24 acts to separate impurities separated along with the glycol in the condensation stages, especially lower molecular weight monomeric or oligomeric materials other than the glycol. Such impurities are usually present in only small quantities so that their recovery and/or disposal from the filter does not represent a serious problem.

The heated and vaporized glycol vapor from evaporator 3 is again supplied through line 4 as the propellant or vaporous jet J and J' in operating the aspirators or vapor jets 1 and 8, respectively. If desired, excess glycol can be removed after filter 24 or from the evaporator 3 and can be easily re-used in the production of the polyester or for other purposes.

The process of the invention is suitable for all stages of the polyester production, i.e., wherever a vacuum may be applied to the polycondensation reactor which is often divided into separate stages of condensation. The present invention is especially applicable, however, where the polycondensation reaction or stage must be carried out at a very low absolute pressure, i.e. under a very high vacuum, for example, below 10 mm.Hg and especially below 5 mm.Hg. The process when carried out in its most preferred manner, as with the apparatus illustrated in the flow sheet drawing, has the advantage that the suctioned off glycol as a vaporous reaction product can be recovered practically completely as a liquid glycol. This means that operating costs are considerably smaller than is the case in the use of a steam operated vacuum jet or aspirator where the glycol either is discharged with the cooling water (in a direct contact condenser) or recovered as a weak aqueous solution (in a surface condenser).

Most importantly, the process and apparatus of the invention provide a trouble-free separation of vaporous reaction products in the production of polyesters while almost completely avoiding environmental pollution with the off gas and condensing liquids.

The invention is hereby claimed as follows:

1. In a process for the separation of vaporous reaction products from the vapor zone of a polycondensation reactor in which a polyester is produced, said vaporous reaction products being drawn off by the suction of a fluid vacuum jet, the improvement which comprises:
   supplying glycol vapor as the jet medium to suction off said vaporous reaction products through at least a first stage vacuum jet;
   condensing at least part of the glycol vapor emerging from the vacuum jet; and
   subsequently separating non-condensable gases and residual condensable vapors from each other by suction withdrawal through a liquid circulating vacuum pump operated by liquid glycol in a closed liquid circuit.

2. A process as claimed in claim 1 wherein glycol vapor is supplied as a jet medium to each of two vacuum jets arranged in sequential stages to continuously draw off said vaporous reaction products, and vapors are condensed by contact with a cooling surface at least following the first stage vacuum jet.

3. A process as claimed in claim 2 wherein the condensed vapors from at least the first stage vacuum jet are separated from non-condensed gases and residual vapors in a cyclone separator.

4. A process as claimed in claim 1 wherein glycol vapor emerging from said at least one vacuum jet is partly condensed and separated by a cyclone separtor following said condensation, the non-condensable gases and residual condensable vapors being withdrawn by suction through a suction line from said cyclone separator to said liquid circulating vacuum pump.

5. A process as claimed in claim 1 wherein the residual condensable vapors are separated by condensation from the non-condensable gases through direct contact with said liquid glycol which is recirculated in the closed circuit of said liquid circulating vacuum pump and which is indirectly cooled with cooling water.

6. A process as claimed in claim 5 wherein non-condensable gases are separately withdrawn at atmospheric pressure from a gas zone in the high pressure side of said closed circuit of the liquid circulating vacuum pump.

7. A process as claimed in claim 1 wherein the final step of separating con-condensable gases is carried out in a rotary vacuum pump of the wet-type.

8. A process as claimed in claim 1 wherein the final step of separating non-condensable gases is carried out in a cycloidal wet vacuum pump providing a low vacuum at a high throughout of non-condensable gases.

9. A process as claimed in claim 1 wherein each stage of the vacuum jet partially increases the pressure from about 0.3 mm Hg up to approximately 30 mm Hg, and the final step of separating the non-condensable gases with liquid circulating vacuum pump brings these non-condensable gases up to approximately atmospheric pressure.

10. A process as claimed in claim 1 wherein the liquid glycol in said closed circulating circuit of the liquid circulating vacuum pump is cooled to a sufficient low operating temperature so that essentially only inert non-condensable gases are released to the atmosphere.

* * * * *

UNITED STATES PATENT AND TRADEMARK OFFICE
CERTIFICATE OF CORRECTION

PATENT NO. : 4,011,202
DATED : March 8, 1977
INVENTOR(S) : Karl Ebner et al

It is certified that error appears in the above-identified patent and that said Letters Patent are hereby corrected as shown below:

Column 6, line 68, after "with" insert --said--.

Signed and Sealed this

Twenty-first Day of March 1978

[SEAL]

Attest:

RUTH C. MASON
Attesting Officer

LUTRELLE F. PARKER
Acting Commissioner of Patents and Trademarks